United States Patent
Lavelle et al.

(10) Patent No.: US 6,877,098 B1
(45) Date of Patent: Apr. 5, 2005

(54) SYSTEM AND METHOD FOR DIRECTING ACCESS FROM A FRAMEBUFFER TO A VIRTUAL FRAMEBUFFER WHEN THE FRAMEBUFFER IS POWERED OFF IN A POWER MANAGEMENT MODE

(75) Inventors: Carol A. Lavelle, Saratoga, CA (US); Joyce Z. Yu, San Jose, CA (US); Eric G. Sultan, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 564 days.

(21) Appl. No.: 09/591,926

(22) Filed: Jun. 12, 2000

(51) Int. Cl.⁷ .............................................. G06F 1/32
(52) U.S. Cl. ...................................... 713/320; 713/324
(58) Field of Search ................................ 713/300, 310, 713/320, 324; 395/750; 364/200, 900

(56) References Cited

U.S. PATENT DOCUMENTS

| | | | | |
|---|---|---|---|---|
| 4,716,543 A | * | 12/1987 | Ogawa et al. | 707/205 |
| 5,127,098 A | | 6/1992 | Rosenthal et al. | 395/650 |
| 5,586,333 A | * | 12/1996 | Choi et al. | 713/320 |
| 5,619,707 A | * | 4/1997 | Suboh | 713/322 |
| 5,787,292 A | * | 7/1998 | Ottesen et al. | 713/300 |
| 5,832,280 A | * | 11/1998 | Swanberg | 713/300 |
| 5,860,016 A | * | 1/1999 | Nookala et al. | 713/324 |
| 6,341,354 B1 | * | 1/2002 | Lee | 713/324 |

FOREIGN PATENT DOCUMENTS

| | | | | |
|---|---|---|---|---|
| JP | 63226757 A | * | 9/1988 | G06F/13/38 |

OTHER PUBLICATIONS

"Direct And Indirect Addressing of Peripheral Devices", IBM Technical Disclosure Bulletin, Jun. 1, 1990, US, pp. 475–477.*

* cited by examiner

*Primary Examiner*—Thuan Du
*Assistant Examiner*—Paul Yanchus
(74) *Attorney, Agent, or Firm*—Meyertons Hood Kivlin Kowert & Goetzel, P.C.; Jeffrey C. Hood

(57) ABSTRACT

Methods and apparatus for managing power of a computer system. Access to a device by a process that accesses the device but does not require user interaction to continue running is prevented during power management and when the device is powered off. Memory space is allocated in the computer system prior to the device being powered off. All access to the device is directed to the allocated memory space during the power management period.

18 Claims, 4 Drawing Sheets

SYSTEM AND METHOD FOR DIRECTING ACCESS FROM A FRAMEBUFFER TO A VIRTUAL FRAMEBUFFER WHEN THE FRAMEBUFFER IS POWERED OFF IN A POWER MANAGEMENT MODE

FIELD OF THE INVENTION

This invention relates to power management of devices in a computer system, in particular, to power management of computer peripheral devices.

BACKGROUND OF THE INVENTION

Power management is desirable for desktop personal computers and workstations because a typical desktop computer system can consume several hundred watts of power per hour when it is turned on, whether or not it is being used. This energy consumption can be quite expensive, particularly in the context of large companies and other institutions that may have hundreds or even thousands of desktop computer systems turned on both day and night. One way to reduce power consumption is to power manage the computer system by, for example, turning off peripheral devices that are not in use or slow down the processes that are running on the computer.

Energy Star (EStar) guidelines are power management guidelines issued by the U.S. Government's Environmental Protection Agency (EPA). EStar guidelines exist for many products, including desktop computers. EStar power management guidelines require specified reduction in power within a specified time for a computer system when no keyboard or mouse activity has been detected. For example, the proposed Memorandum of Understanding 3 (MOU-3) guidelines require the display framebuffer to be powered off after 30 minutes when no keyboard or mouse activities have been detected.

Powering down the framebuffer during power management may present problems to systems that are running window applications that do not require keyboard or mouse activities. For example, a clock tool may continuously update the time display in a window thus requiring access to the display framebuffer regardless of whether there are user activities at the keyboard or the mouse. If the computer system where the window is displayed enters power management mode while the clock tool is running, the clock tool continues to access the framebuffer even though the framebuffer is powered off. Access to the framebuffer when it is powered off causes the system to hang.

SUMMARY OF THE INVENTION

The invention relates to methods and apparatus for allowing a window system that is running processes that access a device but do not require keyboard or mouse interactions to continue running while the device is powered off.

In accordance with the invention, access to the device is prevented when the computer system is in power management state by directing data intended for the device to a memory location. In one embodiment, device registers and memory are accessed via a first mapping supplied by a device driver. When the system is going into power management state, the first mapping is modified to a second mapping. A memory location is allocated for the second mapping which substitutes for the first mapping prior to the device being physically powered off. This second mapping directs all device access to the allocated memory during power management state. When the system exits power management state, the first mapping is restored and the device registers and memory are updated.

In one embodiment, when an idle state has been detected, a device-independent program in an X Server makes a call to a device-dependent program to request power management of a device. The device-dependent program makes a system call to a device driver (e.g., a framebuffer device driver) which then allocates a portion of host memory and informs the device-dependent program to map data intended for the framebuffer to the allocated memory. The device-dependent program requests the power manager to power off the framebuffer. Power manager informs the device driver of the pending framebuffer power off prior to powering off the framebuffer so that the device driver may perform pre-power-down tasks such as saving device state. After power down, data intended for the framebuffer is directed to the allocated portion of the host memory.

When power is restored to the framebuffer, the content of the framebuffer is updated. In one embodiment, the power-up sequence includes the device-independent program in the X Client makes a call to the device-dependent layer requesting power to be restored to the framebuffer. The device-dependent layer which then makes a system call to the power manager to restore power to the framebuffer. The power manager restores power to the framebuffer and informs the device driver. The device driver restores device state and informs the device-dependent program. The device-dependent program makes a system call to the device driver to restore mapping to the framebuffer. The device driver releases the allocated portion of the host memory and directs mapping to the framebuffer. The device-dependent program then updates the framebuffer to its current state.

This summary is not intended to limit the scope of the invention, which is defined solely by the claims attached hereto.

While the specific embodiments are described and illustrated herein, these embodiments are not intended to limit the scope of the invention, which is susceptible to various modifications and alternative forms.

DETAILED DESCRIPTION OF THE INVENTION

Methods and apparatus for managing power supplied to a device in a computer system are provided. Access to the device may be prevented when the computer system is in power management state and the device is powered off. Access requests intended for the device may be redirected to an allocated portion of system memory. While the system of the present invention applies to computer systems in general, the system will be described in the environment of the UNIX operating system in order to simplify the discussion.

Figure 1:
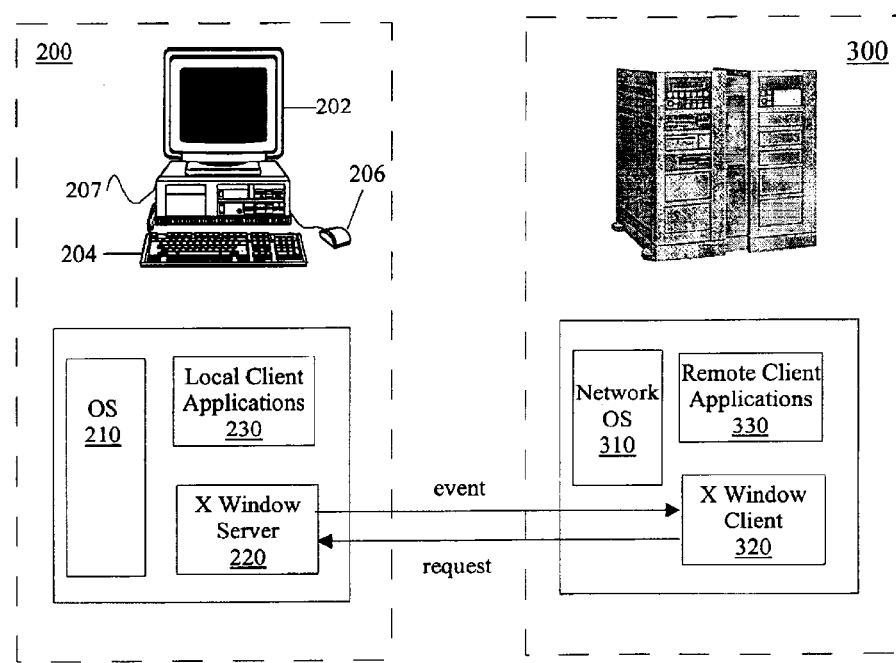
FIG. 1 illustrates an X Window System with its hardware and software components.

FIG. 1 illustrates an X Window system 100 with its hardware and software components. X Window system 100 may be a windowing system that runs under UNIX or other operating systems such as DOS or Windows. X Window system 100 allows users (e.g., clients) to run applications on other computers in the network (e.g., servers) and view the output on their own displays. In other words, a remote computer may update an existing screen or display a new screen on a user machine without input from the local user (e.g., input via a mouse, keyboard, stylus, or other input devices).

X Window system 100 may include a client system 200 (e.g., client user's machine) and a server system 300 (e.g., a remote server machine). X Window system 100 may include multiple client systems and multiple server systems.

Client system 200 (also called an X Server) is the receiving computer in X Window system 100 and may be any suitable computer system such as a desktop, a personal computer or a workstation. In one embodiment, client system 200 includes a display screen 202, a keyboard 204, a mouse 206 and a hard drive 207.

Client system 200 runs an operating system (OS) 210, X Window Server software 220, and local client applications 230. OS 210 provides control for, for example, user interface, job management, task management, data management, and device management for client system 200. OS 210 may be a single user operating system intended for a desktop system and may be, but not limited to, UNIX, Macintosh System 7, DOS, or Windows.

X Window Server software 220 handles, e.g., communications between client applications (e.g., mail, clock, calculator), the display hardware (e.g., monitor, framebuffer), and input devices (e.g., mouse, keyboard). For example, X Window Server software 220 may handle drawings on user display 202, interfaces with device drivers to receive/transmit data from input devices such as keyboard 204 and mouse 206 and other input/output devices such as video display, speaker, scanner, small computer system interface (SCSI), etc., and manages off-screen memory, fonts, cursors, colormaps, etc. X Window Server software 220 may be X Server software for the Solaris™ operating environment by Sun Microsystems, Inc. of Palo Alto, Calif., or any other conventional or suitable X Window Server software.

Local client applications 230 may include applications that do not require keyboard or mouse interactions to continue running and may be, e.g., clock tool, calendar tool, mail tool, etc.

Server system 300 (also called an X Client or an X Window System Client) is the processing computer in X Window system 100 and runs, for example, a network operating system 310, X Window Client software 320 and remote client applications 330. Both X Window Server software 220 and X Window Client software 320 may be run in the same machine. However, for convenience in this description, X Window Server software 220 and X Window Client software 320 will reside on different machines for ease of explanation.

Network OS 310 manages multiple user requests at the same time and may be, but is not limited to, Windows NT, UNIX, or Linux. Server system 300 may be any suitable servers, including Sun Enterprise™ Servers by Sun Microsystems, Inc. of Palo Alto, Calif. Remote client applications 330 may be similar to local client applications 230 and may be any user application programs such as a word processor, spreadsheet, database program, file transfer program, e-mail program, clock program, calculator program, etc.

Within X Window system 100 is typically a socket based protocol (e.g., TCP/IP) for transmitting graphical information between X Window Client software 320 and X Window Server software 220. For example, X Window Client software 320 and X Window Server software 220 communicate through messages, called "requests" if they travel from X Window Client software 320 to X Window Server software 220, and "events" if the messages travel from X Window Server software 220 to X Window Client software 320. X Window Server software 220 maintains a windowing user interface environment on client system 200, and X Window Client software 320 generates requests to create windows, draw objects etc. within that environment. In turn, X Window Server software 220 sends events to X Window Client software 320. Events may be packets of information informing X Window Client software 320 what the user and X Window Server software 220 have performed/executed regarding an application program (e.g. remote client applications 330). For instance, a mouse click from mouse 206 causes an event from X Window Server software 220 to be sent to X Window Client software 320, where remote client applications 330 decide what to do with the mouse event.

Figure 2:
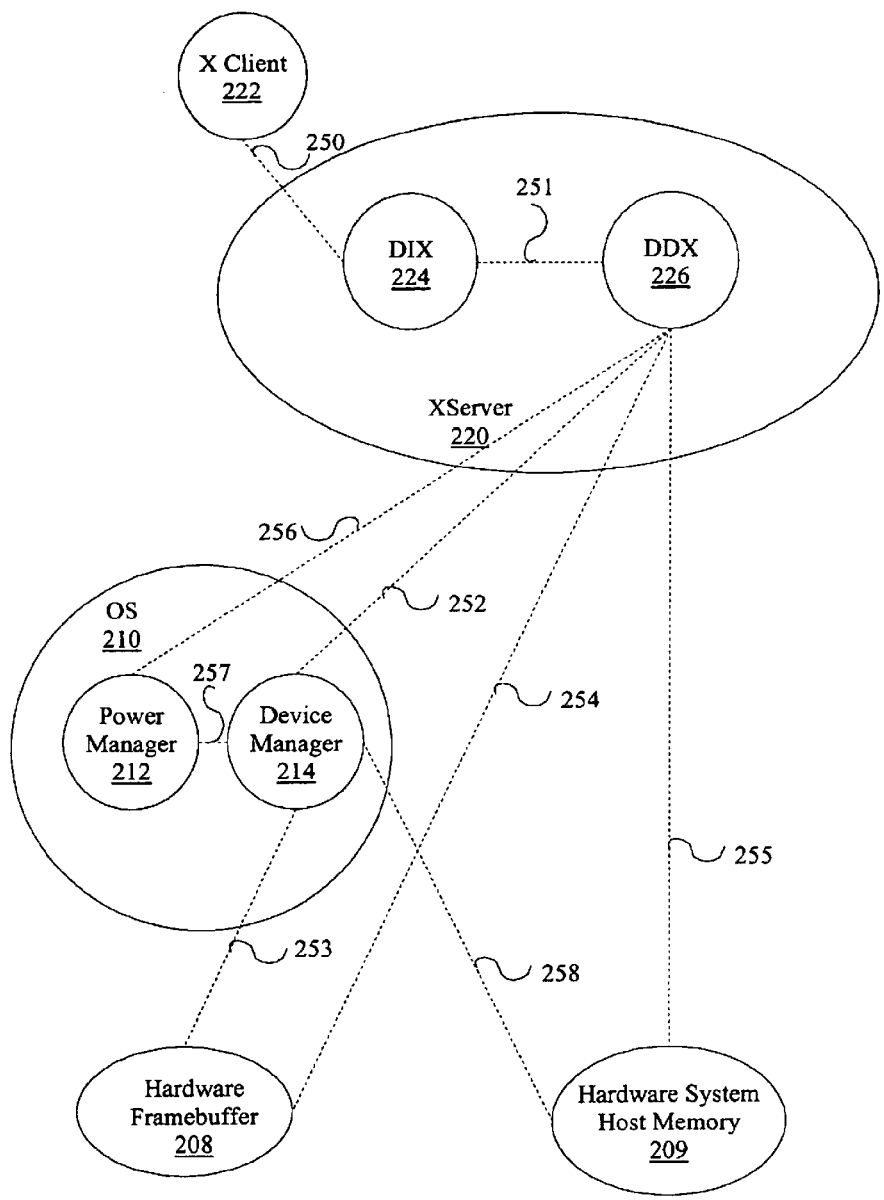
FIG. 2 is a conceptual illustration of software and hardware system components and relations between the components.

FIG. 2 shows a conceptual diagram of software and hardware components of an X Window System 100. For purpose of illustration, FIG. 2 illustrates system components related to power management of a display framebuffer 208. X Client 222 may be either local (e.g., at the user machine) or remote (e.g., at a server machine). X Client 222 runs applications (e.g., local client applications 230 or remote client applications 330) that may involve, for example, graphics-based user interfaces that incorporate icons, pull-down menus and a mouse. The graphics-based user interfaces can be any suitable graphical user interface, e.g., Windows, Macintosh, and X. In a client/server environment, X Client 222 typically resides in the user's client machine, e.g., client system 200, but may reside remotely in a server machine, e.g., server system 300.

X Server (X Window Server software) 220 includes a device-independent layer (DIX) 224 and a device-dependent layer (DDX) 226. DIX 224 is a software program that works with a variety of peripheral devices while hardware-specific instructions are in some other software programs. Thus, DIX 224 typically contains functions that do not depend on graphics hardware. DIX 224 may dispatch client requests, manage the event queue, distribute events to clients, manage visible data structures, and perform other functions. X Client 222 typically makes system calls into a device independent layer (e.g., DIX 224) which then redirect the system calls to the device dependent layer (e.g., DDX 226).

DDX 226 is a software program that addresses specific hardware features and typically works with a particular type of peripheral device. DDX 226 creates and manipulates, for example, pixmaps, clipping regions, colormaps, screens, fonts, and graphic contexts. DDX 226 may contain routines that depend on graphics hardware and input devices that X Server 220 accommodates.

OS 210 includes, for example, a power manager 212 and device drivers 214. Power manager 212 manages power consumption of a computer system (e.g., client system 200 in FIG. 1). In general, power manager 212 contains a set of instructions that provide a software interface to the available power controlling hardware devices and provide routines to device drivers to control power to those hardware devices. Power manager 212 may be implemented in a power management hardware such as a microprocessor or other suitable components.

Device drivers 214 are program routines that link peripheral devices (e.g., hardware framebuffer 208) to the operating system 210 and contain the precise machine language necessary to control the devices as requested by an application. Essentially, device drivers 214 convert the more general input/output instructions of the operating system 210 into messages that devices can understand. Device drivers 214 may include, for example, framebuffer device drivers, keyboard device drivers, floppy disk device drivers, non-SCSI hard disk device drivers, printer device drivers, monitor device drivers, CD-ROM reader device drivers, etc.

In one embodiment, virtual memory mapping may be utilized. Virtual memory systems allow processes to see linear ranges of bytes in their address space regardless of the physical layout or fragmentation of the real physical memory. Virtual memory systems also allow the implementation of a programming model with a larger memory size than available physical storage (e.g., RAM) and to use slower but larger secondary storage (e.g., disk) as a backing store to hold the pieces of memory that do not fit in physical memory. In virtual memory systems, rather than managing every byte of memory, page-sized pieces of memory are used to minimize the amount of work the virtual memory system has to do to maintain virtual to physical memory mapping.

Figure 4:
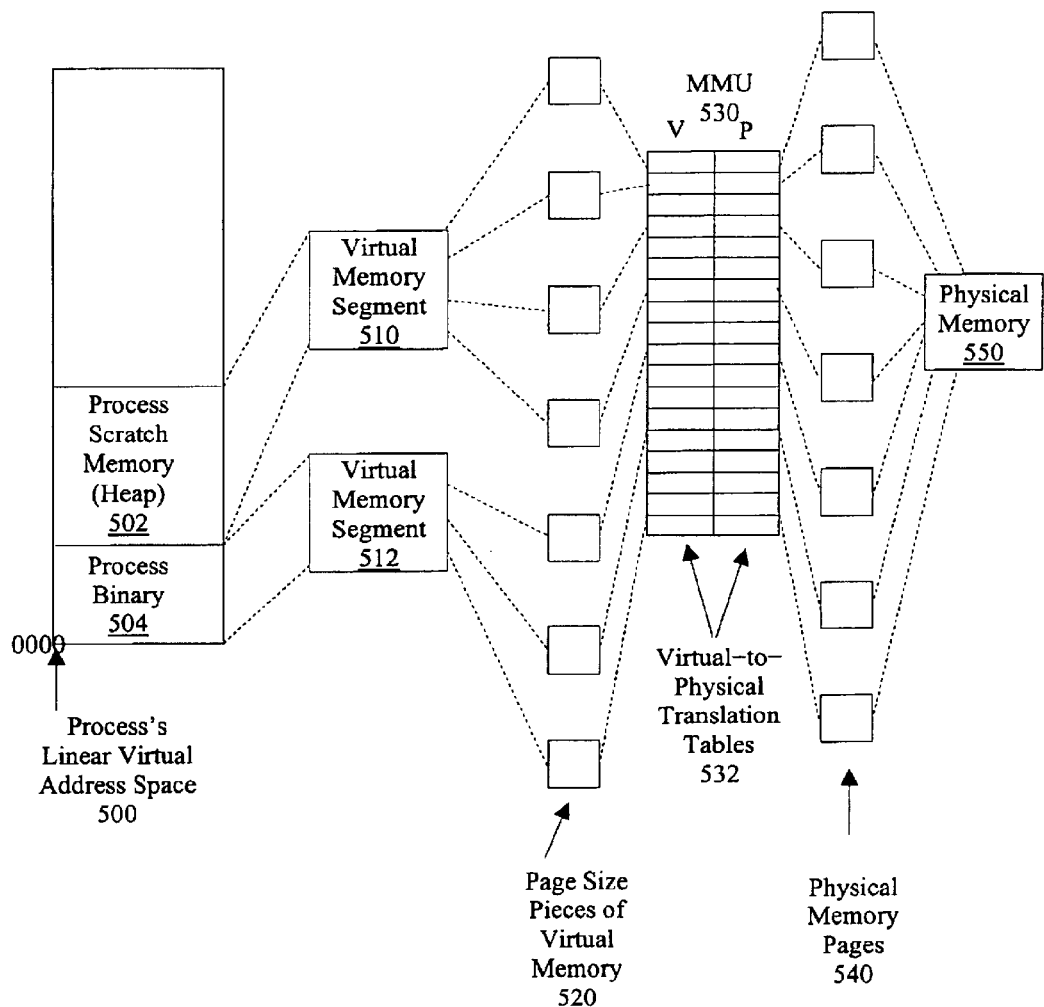
FIG. 4 illustrates an embodiment of the management and translation of the virtual view of memory (the address space) to physical memory by a memory management unit (MMU).

FIG. 4 illustrates an embodiment of virtual memory mapping and shows how the management and translation of the virtual view of memory (the address space) to physical memory is performed by a hardware unit, known as the virtual memory management unit (MMU). In this embodiment, the kernel uses paged memory management which relies on MMU 530 to translate the virtual addresses into physical addresses.

An X Server has an address space 500 that has addresses starting from 0000. Address space 500 includes program codes, stacks and so forth. The kernel breaks up address space 500 into segments, e.g., one for each type of memory area in the address space. For example, a simple process has a memory segment 510 for the process binary 504 and a memory segment 512 for the scratch memory 502 (known as heap space). Each segment manages the mapping for the page-sized virtual address range 520 mapped by that segment and converts that mapping into physical memory pages 540 by implementing a lookup table, e.g., virtual-to-physical translation table 532. Virtual-to-physical translation table 532 may be a platform-specific set of translation tables and having entries with virtual memory addresses V and corresponding physical memory addresses P, thereby allowing the memory system to look up a virtual address and find the physical page containing the address. In one embodiment, device driver 214 sets up translation table 532 in MMU 530.

During normal operation, physical memory 550 may be the device (e.g., framebuffer 208) and during power management, physical memory 550 may be the host memory (e.g., host memory 209). By using virtual memory, the mapping may be limited to just one or a few pages of memory rather than the size of physical framebuffer 208.

In the alternative, memory space of the size of the physical framebuffer 208 may be allocated in hardware system host memory 209. In one embodiment, the content of the virtual framebuffer may mirror that of the physical framebuffer if data was not redirected.

Framebuffer 208 is an area of memory used to hold, for example, a frame of display data such as is typically used for screen displays. Framebuffer 208 may be a separate memory bank on the display adapter that holds the bitmapped image while the image is being "painted" on the screen. Framebuffer 208 is typically of a size that accommodates the maximum image area on the screen. Framebuffer 208 typically allows application software to access the graphic hardware through a well-defined interface and the framebuffer driver typically presents a generic interface across all software and hardware platforms.

Host memory 209 may be kernel memory of a computer system. Host memory 209 may be configured in accordance with system needs/specification. For example, host memory 209 may be configured to contain a portion of memory (e.g., virtual framebuffer) that is the same size as the actual hardware framebuffer 208. In the alternative, host memory 209 may be configured to include a virtual framebuffer that contains pageable memory. D, data written to and read from hardware framebuffer 208 may be mapped to host memory 209 during the power management period when hardware framebuffer 208 is powered off and unavailable.

Typically, to display a window on a user screen, a window manager incorporated into X Client 222 makes a library call to X Window Server software 220 which then makes a library call to DIX 224 via path 250. DIX 224 makes a call to DDX 226 via path 251. DDX 226 then makes a system call to a device driver 214 (e.g., framebuffer driver) in OS 210 via path 252. Device driver 214 then writes into hardware framebuffer 208 via path 253. Alternatively, DDX 226 may write directly into hardware framebuffer 208 via path 254.

The proposed EStar guidelines require the framebuffer to be powered off after 30 minutes when no keyboard or mouse activities have been detected to reduce power consumption. Powering down the framebuffer during power management may present problems to systems that are running window applications that do not require keyboard or mouse activities. For example, access to the framebuffer when the framebuffer is powered off may cause the system to hang.

In accordance with one embodiment of the present invention, display data is routed to the virtual framebuffer allocated in host memory 209 during the power management mode (e.g., when the framebuffer is powered off). For example, the window manager may make a library call into DIX 224 via path 250. DIX 224 then relays the call to DDX 226 via path 251. DDX 226 then accesses the virtual framebuffer in hardware system host memory 209 in hard drive 207 via path 255. The computer system updates hardware framebuffer 208 after power is restored. Other communication paths that accomplish the same purpose are possible.

Figure 3:
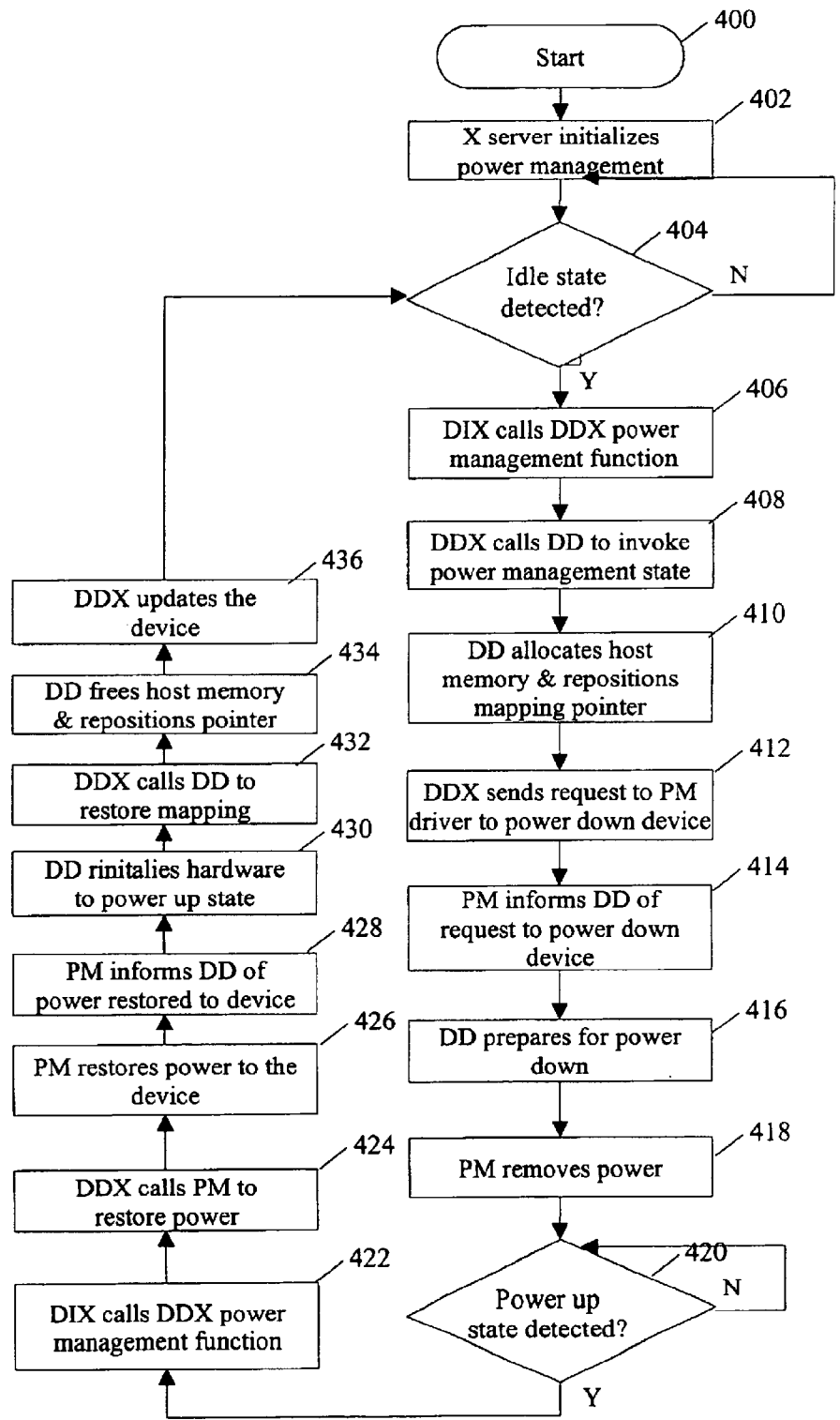
FIG. 3 shows a flowchart of a power management process in accordance with one embodiment of the invention.

FIG. 3 shows a flowchart of a power management process in accordance with one embodiment of the present invention. FIG. 3 will be described with reference to FIGS. 1 and 2. The process starts in step 400, when X Server 220 is started. In step 402, X Server 220 initializes power management for framebuffer 208 using the policies specified on client machine 200. X Server 220 default values may be used for power management initialization. In the alternative, policies used for the power management initialization may be specified using a graphical user interface tool (GUI) which stores the policies in a configuration file on e.g, a disk. The configuration file may be created and updated using other suitable methods. The configuration file may include information such as, but is not limited to, what devices (e.g., framebuffers, disks, scanners, printers, etc.) are to be power managed; whether the system is to be shut off; if the system is to be shut off, the periods of the day when power management should be considered; description of what constitutes an idle state; and when the system should be automatically powered on after the time management period.

During power management initialization, a DDX 226 power management function pointer is stored by X Server 220 and DDX 226 obtains a mapping from device driver 214 that gives a mapping pointer. Device registers and memory are then accessed by DDX 226 via this mapping pointer.

In step 404, X Server 220 periodically checks to see if client system 200 is in an idle state. Idle state may be determined when there are no external activities at client system 200 for a predetermined period of time. For example, idle state may be determined when no user activities have been detected from the keyboard or the mouse for 30 minutes. Idle state may also be determined by other means, including predefined internal or external conditions, as defined in the configuration file. X Server 220 may keep a clock or a counter, to track time elapsed. X Server 220 resets the clock or the counter if external activities are detected and continues to check for activity or idleness by repeating step 404. This same technique could be used to detect other conditions that require power management, such as low battery state, for example.

If an idle state is detected, DIX 224 in X Server 220 makes a call to DDX 226 via path 251 requesting power management of a certain device (e.g., framebuffer 208) in step 406. In step 408, DDX 226 makes a system call to device driver 214 via path 252 requesting device driver 214 to place the device into power management mode. System calls may be in the form of an IOCTL call, a MMAP call or other suitable processes. IOCTL call is an interface for transporting data and/or control between user code and kernel device drivers while MMAP call is a mapping process.

Device driver 214 allocates a portion in hardware system host memory 209 in step 410 and re-positions the DDX 226 mapping pointer to point to the allocated host memory. In this embodiment, the pointer may be returned from device driver 214 to DDX 226 for error checking. In one embodiment, a new pointer is returned from device driver 214 to DDX 226 after memory allocation and DDX 226 then uses the new pointer whenever a device access is made. After memory allocation, instead of pointing to the addresses that will be mapped to the hardware framebuffer 208, the mapping pointer now points to the addresses that will be mapped to the allocated memory in hardware system host memory 209. In other words, the allocated memory will receive the data intended for the framebuffer.

DDX 226 then makes an IOCTL call to power manager 212 via path 256 requesting power manager 212 to power down the device (e.g., framebuffer 208), in step 412. In step 414, power manager 212 informs device driver 214 via path 257 that power manager 212 will be powering down the device so that device driver 214 may perform pre-power-down management tasks.

In step 416, device driver 214 performs pre-power-down management tasks such as saving certain device state so that the device state can be restored after the device is powered back up. Device driver 214 has allocated a portion of kernel memory to store the device state in a software data structure. Any hardware updates which go through device driver 214 are saved in this data structure while the device is powered down. The updates will be written back to the hardware after device is powered back up.

Power manager 212 then sets the device (e.g., framebuffer 208) to the appropriate power level in step 418. In device power management, some devices may have multiple power levels. However, for convenience of this description, it is assumed that when the computer system is in power management mode, the device that is being power managed is powered off.

During the power management period (when hardware framebuffer 208 is powered off), the allocated section of memory acts as a virtual framebuffer where data intended for the actual hardware framebuffer 208 is directed. In other words, data intended for the actual physical framebuffer 208 will be written to and read from the allocated portion in host memory 209 via path 258 during the power off state of the actual hardware framebuffer 208. Since it is assumed that no user is interested in the display during the power management period, and since there is no framebuffer processing of the data written to the device, the data written to the allocated memory may be thrown away. Because there is no data retention requirement, the data may be compressed to a memory area that is smaller than the actual framebuffer memory area. If the data is read, an appropriate value such as a zero or a stored constant value could be read back to allow the process to continue.

During this power management period, server system 200 is still alive and therefore, the kernel is still active. Hence, access to kernel memory or host memory 209 does not cause the system to hang. The applications (e.g., window system software) can continue to operate and update data structures and window system state.

During the off state of framebuffer 208, X Server 220 continues to check for external activities to determine whether to terminate the power management mode in step 420. If there are no conditions that would require the system to power up, framebuffer 208 remains in the power off state.

If X Server 220 determines that the device (e.g., framebuffer 208) should be powered up, X Server 220 triggers the wakeup sequence, e.g., to turn the display on. DIX 224 in X Server 220 relays the power up request to DDX 226 in step 422. In step 424, DDX 226 makes a system call to power manager 212 requesting that power be restored to the device (e.g., framebuffer 208). Power manager 212 restores power to the device in step 426. Power manager 212 then informs device driver 214 that power has been restored to the device in step 428. Device driver 214 initializes the hardware to the power up state and restores the device registers from its software data structures in step 430.

In step 432, DDX 226 makes system calls to device driver 214 to leave power management state and redirect the mapping pointers to framebuffer 208. Device driver 214 changes the pointer and releases the allocated memory in step 434. X Server 220 updates the content of the device in step 436.

For a graphic window display, depending on the application, X Server may redraw all of the windows on the screen. X Server 220 is aware of the geometry of all windows on a screen (e.g., number of windows on the screen and their locations, sizes, orders, types and titles). Thus, for an X Server application, X Server 200 may redraw the related window. Where applications outside of X Server 220 provide the contents of the windows, X Server 220 may send a request to the application to redraw the contents of the associated window. For example, X Server may be able to redraw the border of a clock tool window but the clock tool needs to provide the time display.

The process returns to step 404 to check for idleness.

While the present invention has been described with reference to particular figures and embodiments, it should be understood that the description is for illustration only and should not be taken as limiting the scope of the invention. Many changes and modifications may be made to the invention, by one having ordinary skill in the art, without departing from the spirit and scope of the invention. For example, while the invention has been described with reference to a display framebuffer, it is possible to use the same ideas to manage power for other devices.

We claim:

1. A method for managing power consumption in a computer system, comprising:
   placing said computer system in power management mode;
   requesting removing power from a memory device coupled to said computer system;
   allocating a second memory in said computer system;
   removing power from said memory device; and
   directing access intended for said memory device to said second memory while power is removed from said memory device;
   wherein said memory device and said second memory each comprises a plurality of addressable locations, and wherein for each address location in said second memory, there are a plurality of corresponding address locations in said memory device.

2. The method of claim 1, further comprising executing a process that includes instructions for accesses to said memory device, said accesses being directed to said second memory.

3. The method of claim 2, further comprising reading data from said second memory to allow said process to continue running.

4. The method of claim 2, further comprising writing data generated from said process to said second memory.

5. The method of claim 1, further comprising detecting an idle state of said computer system, and wherein said requesting removing power is responsive to said detection of said idle state.

6. The method of claim 1, further comprising determining whether there has been external activities at said computer system for a predetermined time.

7. The method of claim 6, wherein said external activities comprise activities at a keyboard or a mouse coupled to said computer system.

8. The method of claim 1, further comprising:
   restoring power to said memory device;
   restoring device state to said memory device; and
   updating said memory device.

9. The method of claim 1, further comprising releasing said second memory and restoring a first mapping such that data is mapped to said memory device.

10. The method of claim 8, wherein said updating comprises redrawing windows on a display device.

11. A method for power managing a framebuffer coupled to a computer system, comprising directing access requests intended for said framebuffer to a memory in the computer system, while said computer system is in a power management mode and said framebuffer is powered off, wherein said framebuffer and said memory each comprises a plurality of addressable locations, and wherein for each address location in said memory, there are a plurality of corresponding address locations in said framebuffer.

12. The method of claim 11, wherein a specified constant value is stored in each of the plurality of addressable locations in said memory, and wherein the constant value is read back when the framebuffer is powered back on.

13. The method of claim 11, wherein said framebuffer and said memory each contains a plurality of addressable locations, and wherein there are fewer addressable locations in said memory than addressable locations in said framebuffer.

14. The method of claim 11, wherein accesses to all addressable locations in said framebuffer are directed to a single addressable location in said memory.

15. A computer system with power management capabilities, comprising a power management circuit capable of directing access intended for a memory device coupled to said computer system to a second memory in said computer system when said computer system is in a power management mode and said memory device is powered off, wherein said memory device and said second memory each comprises a plurality of addressable locations, and wherein for each address location in said second memory, there are a plurality of corresponding address locations in said memory device.

16. The computer system of claim 15, wherein said power management circuit comprises:
   a server for handling communication between a process and the memory device;
   a device driver for accessing said memory device; and
   a power manager for setting a power level of said memory device.

17. A computer system with power management capability, comprising:
   a display device;
   a framebuffer associated with said display device; and
   a virtual framebuffer, wherein access to said framebuffer is directed to said virtual framebuffer when said computer system is in power management mode and said framebuffer is powered off;
   wherein said framebuffer and said second memory each comprises a plurality of addressable locations, and wherein for each address location in said virtual framebuffer, there are one or more corresponding address locations in said framebuffer.

18. A computer readable medium which stores program instructions for power management, wherein the program instructions are executable by a processor to:
   direct access intended for a memory device to a second memory during power management mode of a computer system coupled to said memory device and when said memory device is powered off;
   wherein said memory device and said second memory each comprises a plurality of addressable locations, and wherein for each address location in said second memory, there are a plurality of corresponding address locations in said memory device.

* * * * *